United States Patent [19]

Inagaki et al.

[11] Patent Number: 4,514,138
[45] Date of Patent: Apr. 30, 1985

[54] LEAKAGE WATER DISCHARGE METHOD AND APPARATUS IN A REVERSIBLE HYDRAULIC MACHINE

[75] Inventors: Taizo Inagaki, Yokohama; Kentaro Ichikawa, Chigasaki; Hitoshi Kido; Yozo Kawase, both of Yokohama, all of Japan

[73] Assignee: Tokyo Shibaura Denki Kabushiki Kaisha, Kawasaki, Japan

[21] Appl. No.: 469,271

[22] Filed: Feb. 24, 1983

[30] Foreign Application Priority Data

Feb. 26, 1982 [JP] Japan .................... 57-30208

[51] Int. Cl.³ ............................. F03B 15/04
[52] U.S. Cl. ........................ 415/1; 415/168
[58] Field of Search .............. 415/1, 112, 168, 169 R, 415/500

[56] References Cited

U.S. PATENT DOCUMENTS

| 3,238,534 | 3/1966 | Hartland | 415/1 |
| 3,890,059 | 6/1975 | Takase | 415/1 |
| 3,985,464 | 10/1976 | Hachiya et al. | 415/1 |
| 4,158,525 | 6/1979 | Kawase et al. | 415/1 |

FOREIGN PATENT DOCUMENTS

| 47911 | 11/1979 | Japan | 415/26 |
| 48003 | 3/1980 | Japan | 415/1 |
| 1074690 | 7/1967 | United Kingdom | 415/500 |

Primary Examiner—Henry C. Yuen
Assistant Examiner—John Kwon
Attorney, Agent, or Firm—Schwartz, Jeffery, Schwaab, Mack, Blumenthal & Koch

[57] ABSTRACT

An apparatus for use in a method for discharging leakage water from guide vanes of a reversible hydraulic machine when the guide vanes are fully closed under the water surface of a runner being depressed comprises a runner connected to a main shaft of the hydraulic machine and covered with upper and lower covers, a plurality of guide vanes arranged at a peripheral portion of the runner, first and second discharge pipes provided with first and second discharge valves and arranged so as to connect a discharge conduit and a runner chamber formed between the runner and one of the covers, and a device for operating said discharge valves. A leakage water discharge method is carried out in accordance with such control mode as that the first and second discharge valves are both opened when the runner rotates in a power generation direction and one of the discharge valves is opened when said runner rotates in a pumping-up direction.

1 Claim, 4 Drawing Figures

LEAKAGE WATER DISCHARGE METHOD AND APPARATUS IN A REVERSIBLE HYDRAULIC MACHINE

BACKGROUND OF THE INVENTION

This invention relates to a method for discharging leakage water from guide vanes of a reversible hydraulic machine, more particularly, in which resisting torque of a runner against the leakage water and temperature of the runner can be properly maintained and a thin water film having a suitable thickness is formed on the inner surfaces of the guide vanes to prevent air from leaking into a casing of the machine at a time of fully closing guide vanes of the hydraulic machine which carries out, at this time, water surface depression operation in both cases of a power generation direction and a pumping-up direction.

In a conventional hydraulic machine provided with movable guide vanes, resisting torque of the runner of the hydraulic machine is reduced by the steps of fully closing the movable guide vanes at a time of a condenser operation or a pumping-up stand-by operation, supplying compressed air into a runner chamber located inside the guide vanes, and then rotating the runner in the air with water surface being depressed.

In the hydraulic machine of the type described above, sealing packings are provided to upper and lower ends of the guide vanes to positively reduce water leakage from the fully closed guide vanes into the runner chamber, but actually, some amount of leakage water is inevitable. The water leaked from the guide vanes adheres on the outer peripheral surface of the runner by a centrifugal force generated when the runner rotates and resisting torque is generated in case of idle running of the runner. In addition, the temperature of the leakage water rises due to agitation for a long time to thereby expand the runner, which fact may bring about dangerous contact between the runner and upper or lower cover for the runner.

With a conventional hydraulic machine, in order to obviate such dangerous contact, the leakage water was discharged into a draft tube by interconnecting the runner chamber and the draft tube through a discharge pipe or arranging a discharge pipe so as to connect a lower cover located between the runner and the guide vanes to the draft tube.

However, with a reversible hydraulic machine in which the runner is rotatable in opposite directions, when the rotating direction of the runner changes to the condenser operation or the pumping-up stand-by operation, pressures different in both cases due to the centrifugal force are applied on a point of the outer periphery of the runner and the discharge efficiencies of the leakage water are also different in both the cases. Namely, when the discharge pipe is designed suitably for a condenser operation, a relatively large amount of the leakage water is discharged in a case where the hydraulic machine runs as a pumping-up stand-by operation and a considerably thin water film will adhere onto the inner surface of the runner, thus becoming less effective for cooling it. For the reasons described above, air adapted to depress water surface in the runner chamber leaks into a casing through a side gap between the guide vanes, then an inlet valve of the hydraulic machine is opened, and the leakage air swells rapidly and rises into a penstock, thus damaging an intake gate provided for the penstock. Moreover, the fact that the water film having a considerably small thickness is formed on the surface of the runner adversely affects the cooling effect of the runner and the runner expands due to the temperature rise of the compressed air agitated by the idle running of the runner at the outer periphery thereof. Thus, the dangerous contact may occur between the runner and the upper or lower cover. Particularly, with a hydraulic machine characterized by a high head, since the runner is generally rotated with a high speed, the temperature of the leakage compressed air rises in a short time and the possibility of the dangerous contact will be considerably high.

SUMMARY OF THE INVENTION

An object of this invention is to provide a method for discharging leakage water from guide vanes of a reversible hydraulic machine so as to maintain water film having a suitable thickness on the inner surfaces of the guide vanes in both cases when the runner of the hydraulic machine is operated in a power generation direction and a pumping-up direction.

Therefore, according to one aspect of this invention, there is provided a method for discharging leakage water from guide vanes of a reversible hydraulic machine when the guide vanes are fully closed under water surface of a runner being depressed, the machine being of the type comprising a runner connected to a main shaft of the hydraulic machine and covered with upper and lower covers, a plurality of guide vanes arranged at a peripheral portion of the runner, first and second discharge pipes provided with first and second discharge valves and arranged so as to connect a discharge conduit and a runner chamber formed between the runner and one of the covers, and a device for operating the discharge valves, and the discharge method comprises the steps of opening both of the first and second discharge valves when the runner rotates in a power generation direction and opening one of the discharge valves when said runner rotates in a pumping-up direction.

According to the other aspect of this invention there is provided an apparatus for discharging leakage water from guide vanes of a reversible hydraulic machine when the guide vanes are fully closed under water surface of a runner being depressed, the apparatus comprising a runner connected to a main shaft of the hydraulic machine and covered with upper and lower covers, a plurality of guide vanes arranged at a peripheral portion of the runner, first and second discharge pipes provided with first and second discharge valves and arranged so as to connect a discharge conduit and a runner chamber formed between the runner and one of the covers, and a device for operating the discharge valves, in which the first and second discharge valves are both opened when the runner rotates in a power generation direction and one of the discharge valves is opened when said runner rotates in a pumping-up direction.

BRIEF DESCRIPTION OF THE DRAWINGS

In the accompanying drawings

DESCRIPTION OF THE PREFERRED EMBODIMENT

Figure 1:
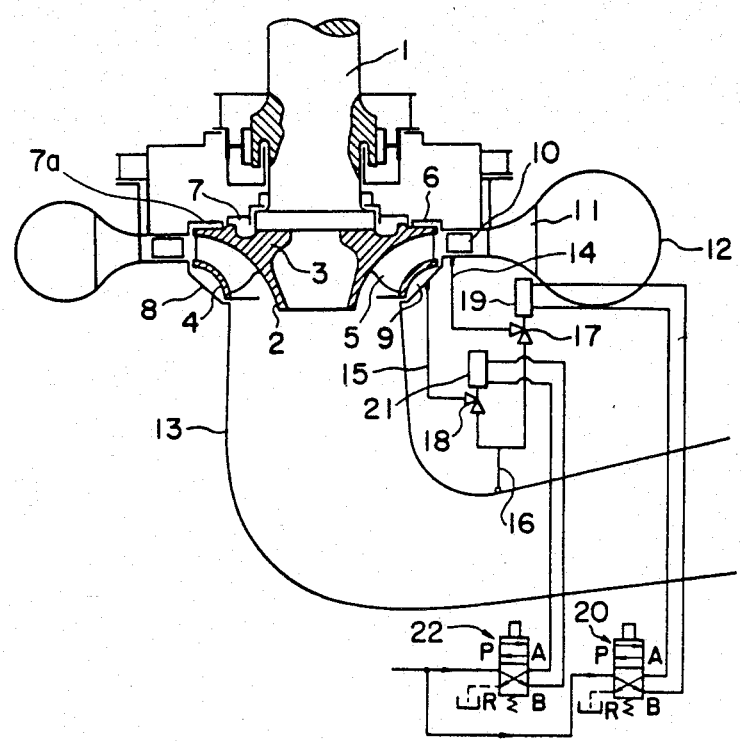
FIG. 1 shows a diagrammatic view of a reversible hydraulic machine for embodying the leakage water discharge method according to this invention.

Referring to FIG. 1, a main shaft 1 of a reversible pump-turbine directly connected to a generatormotor, not shown, is provided with a lower end to which a runner 2 is secured. The runner 2 comprises a runner crown 3, a runner band 4, and a plurality of runner blades 5 disposed between the runner crown 3 and band 4. The upper portion of the runner 2 is covered with an upper cover (head cover) 6 to form an inner back pressure chamber 7 and an outer back pressure chamber 7a therebetween, and the lower portion thereof is covered with a lower cover (bottom ring) 8 to form a side pressure chamber 9 therebetween. These pressure chambers constitute a runner chamber.

A plurality of movable guide vanes 10 operable at a variable degree of opening are arranged radially outwardly of the runner 2, and a plurality of stay vanes 11 are also arranged outward the guide vanes 10. On the outside of the stay vanes 11 is located a spiral casing 12 connected to a penstock, not shown. A draft tube 13 is connected to the lower cover 8 so as to discharge water passing through the runner 2 into a spillway when the hydraulic machine is operated as a turbine.

A first discharge pipe 14 is connected to and extends downwardly from the lower cover 8 directly below the movable guide vanes 10 and a second discharge pipe 15 extends downwardly from the side pressure chamber 9. The discharge pipes 14 and 15 are both connected at their downstream ends to a main discharge duct 16 having a discharge port connected to the draft tube 13. The discharge pipes 14 and 15 may be connected to the upper cover 6 (i.e., runner chamber) at portions inside of the inner periphery of the guide vanes.

Discharge valves 17 and 18 are incorporated in the first and second discharge pipes 14 and 15, respectively, and these valves are operated and controlled independently by actuators 19 and 21. The actuators 19 and 21 are respectively connected to ports A and B of first and second change-over valves 20 and 22 provided with ports P connected to hydraulic pressure sources, respectively. The discharge valves 17 and 18 can be controlled so as to stepwisely or partially open or close them in accordance with a control mode in place of fully opening or closing them.

A leakage water discharge method according to this invention will be described hereunder in the use of the leakage water discharge system mentioned above.

With a reversible hydraulic machine, discharge efficiencies of leakage water are generally different because of the specific shapes of the runner blades 5 in cases where the hydraulic machine is operated under a condenser condition and pumping-up stand-by condition. Namely, with reference to FIGS. 3 and 4, under the condenser operation, the runner blades 5 are rotated in a direction shown by an arrow in FIG. 3 at a speed $\omega$ of revolution and under the pumping-up stand-by operation, the runner blades 5 are rotated in an arrowed direction in FIG. 4 at a speed $\omega$ of revolution.

Figure 2:
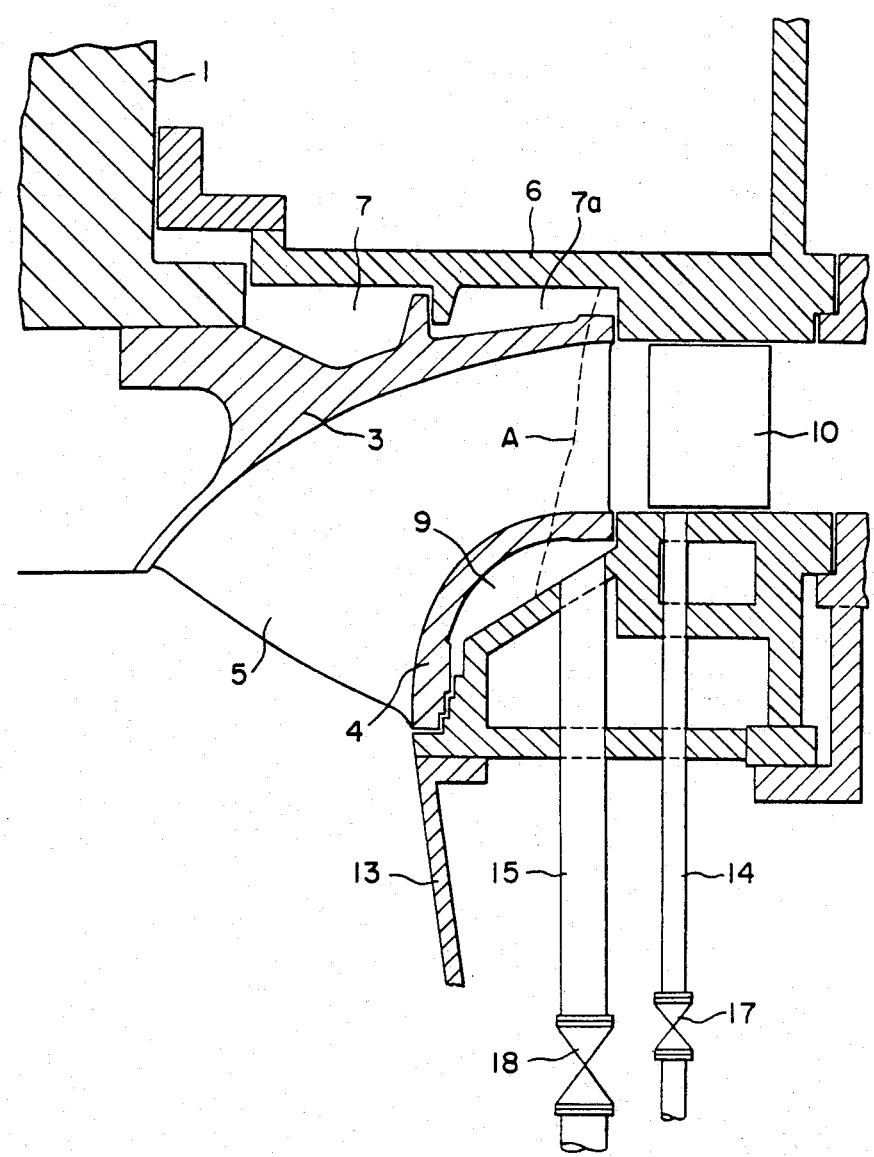
FIG. 2 is an enlarged sectional view of a portion of the hydraulic machine shown in FIG. 1.

Now, as one preferred embodiment, will be discussed a case in which leakage water from the guide vanes 10 intrudes, as shown by dotted line A in FIG. 2, into the outer periphery of the runner 2.

Figure 3:
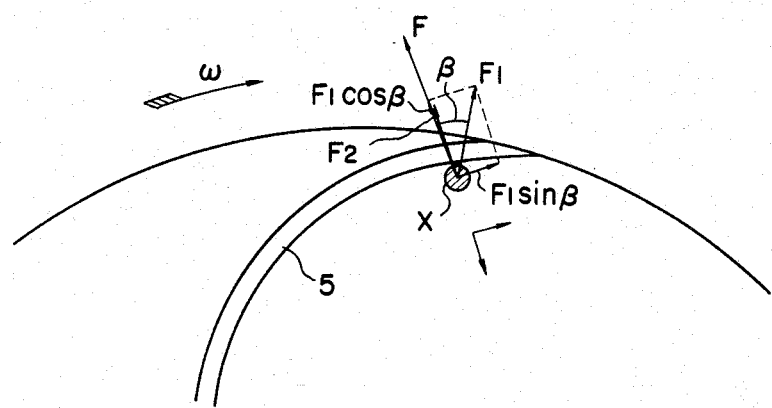
FIG. 3 and FIG. 4 are views for explaining relationships between the runner blade of the hydraulic machine and the leakage water.
Figure 4:
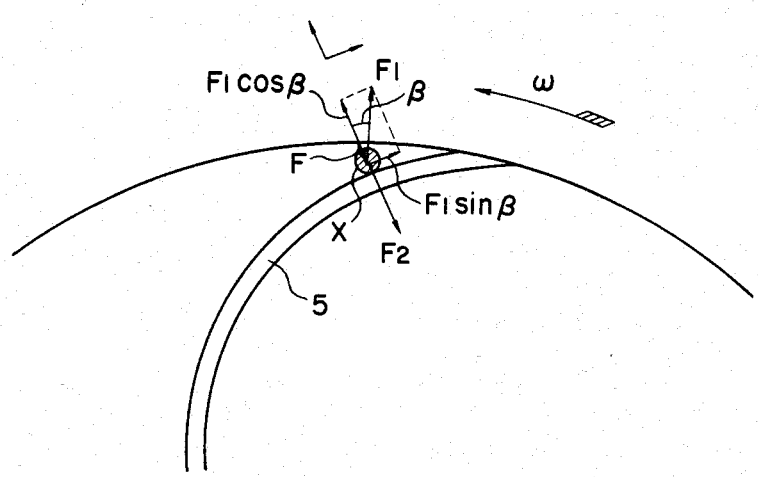

Although it is difficult to show the behavior of the water in the interior of the runner with a numerical value or equation, assuming that water existing on the surface of the runner blade 5 on which a high pressure is applied (i.e. on the surface facing the blade rotating direction as shown in FIG. 3 or FIG. 4), the water being considered as a main factor for generating resisting torque, would have a mass point X having a mass m positioned apart from the center of the blades 5 by a distance of the radius r, a centrifugal force, in a radial direction, $F_1 = mr\omega^2$ is applied on this mass point X. Assuming also that the mass point X would move along the runner blade 5 at a speed u, Coriolis force $F_2 = 2m\omega u$ and vertical component force, $F_1 \cos \beta$, of the centrifugal force ($\beta$ is an angle between the vertical axis of the guide vane and the direction of the centrifugal force) act in the vertical direction on a point of the blade 5 to which the mass point X contacts and horizontal component force, $F_1 \sin\beta$, also acts thereon in the horizontal direction.

As understood from FIGS. 3 and 4, relationships between these forces will be expressed with equations as follows for the respective times when the reversible hydraulic machine is operated as the condenser operation and the pumping-up stand-by operation. Although the condenser operation includes both cases of the rotation of the blades 5 in the power generation direction and the pumping-up direction, only the rotation in the power generation direction is now referred to hereunder.

Condenser Operation (When the blade 5 rotates in a power generation direction: FIG. 3)
Vertical Component Force on Runner Blade:

$$F = -F_1 \cos \beta - F_2 \qquad (1)$$
$$= -mr\omega^2 \cos\beta - 2m\omega u$$

Horizontal Component Force on Runner Blade:

$$F_1 \sin \beta = mr\omega 2 \sin \beta \qquad (2)$$

Pumping-up Stand-by Operation (When the blade 5 rotates in a pumping-up direction: FIG. 4)
Vertical Component Force on Runner Blade:

$$F = F_1 \cos \beta - F_2 \qquad (3)$$
$$= mr\omega^2 \cos\beta - 2m\omega u$$

Horizontal Component Force on Runner Blade:

$$F_1 \sin \beta = mr\omega^2 \sin \beta \qquad (4)$$

Adhering forces $F_0$ of the mass point X on the runner blade 5 are expressed as follows by multiplying the forces (1) and (3) by $\mu$ (coefficient of friction of water).
Condenser Operation:

$$F_0 = \mu F \qquad (1)'$$
$$= -\mu m r\omega^2 \cos \beta - 2\mu m\omega u$$

Pumping-up Stand-by Operation:

$$F_0 = \mu F \qquad (3)'$$
$$= \mu m r\omega^2 \cos \beta - 2\mu m\omega u$$

Therefore, it is necessary to satisfy the following equations to displace the mass point X in the outward peripheral direction under the condenser operation and the pumping-up stand-by operation, respectively.

$$mr\omega^2\sin \beta - \mu mr\omega^2\cos \beta - 2\mu m\omega u > 0 \qquad (5)$$

$$mr\omega^2\sin \beta + \mu mr\omega^2\cos \beta - 2\mu m\omega u > 0 \qquad (6)$$

As is evident from these equations (5) and (6), under the condenser operation, the leakage water intruded into the interior of the runner 2 is relatively hardly displaced outwardly and the greater portion thereof remains therein to thereby increase the resisting torque and raise the temperature of the water. On the contrary, under the pumping-up stand-by operation, the leakage water intruded into the interior of the runner 2 is relatively easily displaced outwardly by the rotation of the blade 5 and only a small portion remains in the runner.

According to this invention, under the condenser operation of a reversible hydraulic machine, leakage water is sufficiently discharged by simultaneously fully opening discharge valves 17 and 18 provided for discharge pipes 14 and 15 so as to prevent intrusion of leakage water into the runner 2, and under the pumping-up stand-by operation, the leakage water is discharged by fully opening one of the discharge valves 17 and 18 and closing the other one thereof to thereby prevent excess water discharge and to form thin water films on the surfaces of the guide vanes to prevent air from leaking and to maintain proper cooling effect.

Moreover, according to this invention, during the condenser or pumping-up stand-by operation of a reversible hydraulic machine, leakage water can effectively be discharged and the maintenance of thin water films on the surfaces of guide vanes can attain sufficient cooling effect, and in addition, idle running of a runner for a long time can be achieved without any operational trouble.

We claim:

1. A method of discharging water leaking past a plurality of guide vanes of a reversible hydraulic machine when the plurality of guide vanes are closed and a runner chamber in said hydraulic machine has been provided with compressed air to depress a water level within said runner chamber, the reversible hydraulic machine having a runner, the runner adapted to rotate in one of a first direction and a second direction opposite to the first direction, and having a plurality of curved runner blades, each runner blade having a concave face which leads the runner blade when the runner rotates in the first direction, and a convex face which leads the runner blade when the runner blade rotates in the second direction, a first cover disposed above the runner, a second cover disposed below the runner, said runner chamber being defined between said runner and one of said first and second covers, a draft tube disposed adjacent and below the runner, first discharge means connected to the runner and to the draft tube for discharging water from the runner chamber to the draft tube when the first discharge means is open, second discharge means connected to the runner chamber and to the draft tube for discharging water from the runner chamber to the draft tube when the second discharge means is open, the plurality of guide vanes being disposed radially outward of the runner, comprising the steps of:

opening both of the first and second discharge means to maintain a water film of predetermined thickness on said inner surfaces of said guide vanes when the runner is rotating in the first direction; and opening only one of the first and second discharge means to maintain said water film of predetermined thickness on said inner surfaces of said guide vanes when the runner is rotating in the second direction;

thereby to maintain said water film of predetermined thickness on said inner surfaces of said guide vanes regardless to direction of rotation of said runner, so as to substantially seal said compressed air within said runner chamber without overheating or unnecessarily dissipating the rotational kinetic energy of said runner.

* * * * *